(12) United States Patent
Wang et al.

(10) Patent No.: US 9,977,317 B2
(45) Date of Patent: May 22, 2018

(54) ILLUMINATION SYSTEM AND PROJECTION DEVICE

(71) Applicant: Coretronic Corporation, Hsin-Chu (TW)

(72) Inventors: Chi-Hsun Wang, Hsin-Chu (TW);
Chang-Hsuan Chen, Hsin-Chu (TW);
Hsuan-I Wu, Hsin-Chu (TW);
Ko-Shun Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days. days.

(21) Appl. No.: 15/489,750

(22) Filed: Apr. 18, 2017

(65) Prior Publication Data

US 2017/0315430 A1    Nov. 2, 2017

(30) Foreign Application Priority Data

Apr. 29, 2016   (CN) .......................... 2016 1 0278176

(51) Int. Cl.
*G03B 21/20*     (2006.01)
*H04N 9/31*      (2006.01)
(Continued)

(52) U.S. Cl.
CPC ......... *G03B 21/204* (2013.01); *G02B 26/008* (2013.01); *G02B 27/102* (2013.01);
(Continued)

(58) Field of Classification Search
CPC .............. G03B 21/204; G03B 21/2013; G03B 21/2033; G03B 21/208; H04N 9/3158; H04N 9/3161; H04N 9/3164
See application file for complete search history.

(56) References Cited

U.S. PATENT DOCUMENTS 8,840,253 B2    9/2014  Kitano
2010/0141896 A1 6/2010  Chen et al.
(Continued)

FOREIGN PATENT DOCUMENTS

CN    101923273    12/2010
CN    102890398    1/2013
(Continued)

OTHER PUBLICATIONS

"Search Report of Europe Counterpart Application", dated Sep. 20, 2017, p. 1-p. 8.

*Primary Examiner* — Ryan Howard
(74) *Attorney, Agent, or Firm* — JCIPRNET

(57) ABSTRACT

An illumination system and a projection device are disclosed. The illumination system includes laser light sources, a color wheel element and light combiners. The laser light sources provide laser lights of different colors. One of the laser light sources is disposed on an optical axis. The color wheel element is disposed on the optical axis and on a transmission path of the laser lights, and adjusts wavelengths of the laser lights. The light combiners are disposed on the optical axis and between the laser light source and the color wheel element. The light combiners are pervious to the laser lights or reflect the laser lights to combine the laser lights on the optical axis. The illumination system uses the laser light sources to provide lights of different colors, and in collaboration with a configuration structure of the optical elements thereof, the laser lights with a wider color gamut are provided.

24 Claims, 1 Drawing Sheet

(51) Int. Cl.
  *G02B 26/00* (2006.01)
  *G02B 27/10* (2006.01)
  *G02B 27/14* (2006.01)
  *G03B 33/08* (2006.01)

(52) U.S. Cl.
  CPC ......... *G02B 27/141* (2013.01); *G03B 21/208* (2013.01); *G03B 21/2013* (2013.01); *G03B 21/2066* (2013.01); *G03B 33/08* (2013.01); *H04N 9/3158* (2013.01)

(56) References Cited

U.S. PATENT DOCUMENTS

| | | | |
|---|---|---|---|
| 2011/0205502 A1 | 8/2011 | Kato et al. | |
| 2011/0310353 A1 | 12/2011 | Maeda | |
| 2013/0100639 A1* | 4/2013 | Li | G02B 27/149 |
| | | | 362/84 |
| 2013/0100644 A1 | 4/2013 | Hu et al. | |
| 2013/0194551 A1 | 8/2013 | Zhang et al. | |
| 2016/0004148 A1 | 1/2016 | Chiu et al. | |

FOREIGN PATENT DOCUMENTS

| | | |
|---|---|---|
| CN | 102289141 | 7/2015 |
| CN | 104980721 | 10/2015 |
| CN | 107329356 | 11/2017 |
| EP | 2787391 | 10/2014 |
| TW | 200916824 | 4/2009 |
| TW | 201542966 | 11/2015 |
| TW | 201546534 | 12/2015 |

\* cited by examiner

ILLUMINATION SYSTEM AND PROJECTION DEVICE

CROSS-REFERENCE TO RELATED APPLICATION

This application claims the priority benefit of China application serial no. 201610278176.2, filed on Apr. 29, 2016. The entirety of the above-mentioned patent application is hereby incorporated by reference herein and made a part of this specification.

BACKGROUND OF THE INVENTION

Field of the Invention

The invention relates to an illumination system and a projection device, and particularly relates to an illumination system capable of providing lights with a wide color gamut and a projection device using the same.

Description of Related Art

Along with development of technology, solid state illumination (SSI) such as light-emitting diode (LED) has been widely applied to light sources in a projection device. Since a light-emitting spectrum of the SSI is used as a pure color light source of the projection device, by exciting a wavelength conversion material such as phosphor, the light source required for projecting images can be properly provided. However, in order to simultaneously use a light emitted by the SSI and a light converted by the wavelength conversion material to serve as the light source required for projecting images, the SSI and the wavelength conversion material require an additional light combiner and optical elements such as lenses, a field mirror, a reflection mirror, etc. to adjust a suitable optical path. Therefore, in the existing technique, the illumination system required by the projection device has a complicate structure, and the light provided by the illumination system generally has a narrow color gamut, which is not complied with a requirement of an actual application, for example, cannot satisfy a requirement of color gamut REC.2020.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention is directed to an illumination system and a projection device, which has a simple structure and capable of providing lights with a wide color gamut.

Other objects and advantages of the invention can be further illustrated by the technical features broadly embodied and described as follows.

In order to achieve one or a portion of or all of the objects or other objects, an embodiment of the invention provides an illumination system including a plurality of laser light sources, a first color wheel element and a plurality of light combiners. The laser light sources are adapted to provide laser lights of a plurality of different colors. The laser light sources include a first laser light source, which is disposed on an optical axis. The first color wheel element is disposed on the optical axis and on a transmission path of the laser lights. The first color wheel element is used for adjusting wavelengths of the laser lights. The light combiners are disposed on the optical axis and between the first laser light source and the first color wheel element. The light combiners are pervious to the laser lights or reflect the laser lights, and the light combiners combine the laser lights on the optical axis.

In order to achieve one or a portion of or all of the objects or other objects, an embodiment of the invention provides a projection device including an illumination system, a light valve and a lens device. The illumination system includes a plurality of laser light sources, a first color wheel element and a plurality of light combiners. The laser light sources are adapted to provide laser lights of a plurality of different colors. The laser light sources include a first laser light source, which is disposed on an optical axis. The first color wheel element is disposed on the optical axis and on a transmission path of the laser lights. The first color wheel element is used for adjusting wavelengths of the laser lights. The light combiners are disposed on the optical axis and between the first laser light source and the first color wheel element. The light combiners are pervious to the laser lights or reflect the laser lights, so as to combine the laser lights on the optical axis. The light valve is disposed on a transmission path of the combined laser lights, and modulates the combined laser lights into an image light. The lens device is disposed on a transmission path of the image light.

According to the above description, the embodiments of the invention have at least one of the following advantages or effects. In the embodiments of the invention, the illumination system uses the laser light sources to provide lights of different colors, and in collaboration with a configuration structure of the optical elements thereof, the laser lights with a wider color gamut can be provided.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

The present invention will now be described more fully with reference to the accompanying drawings, in which exemplary embodiments of the invention are shown. The terms used herein such as "above", "below", "front", "back", "left" and "right" are for the purpose of describing directions in the figures only and are not intended to be limiting of the invention.

Figure 1:
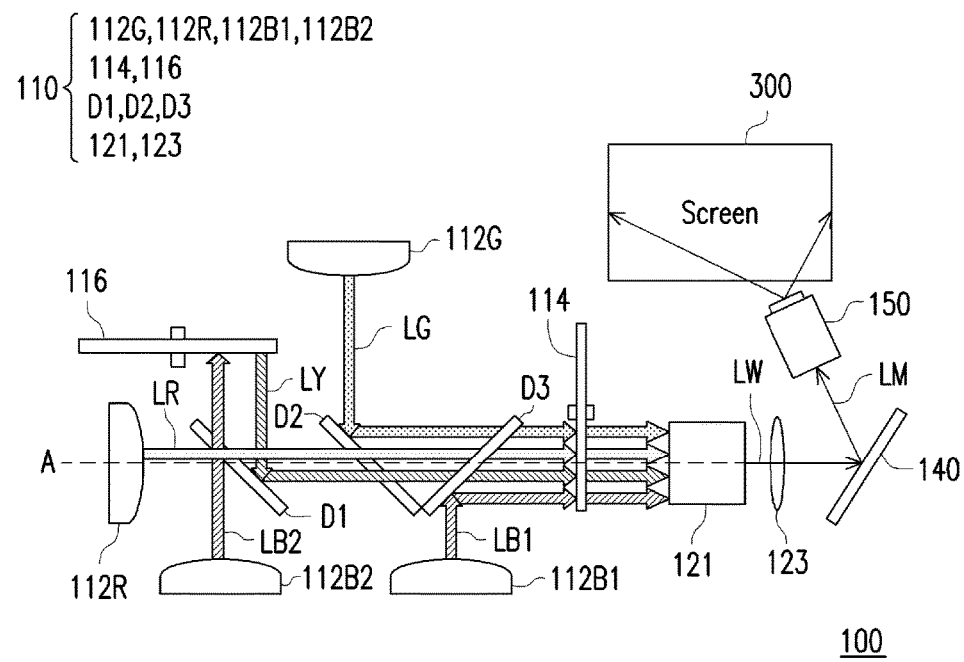
FIG. 1 is a schematic diagram of a projection device according to an embodiment of the invention.

FIG. 1 is a schematic diagram of a projection device according to an embodiment of the invention. Referring to FIG. 1, the projection device 100 of the embodiment includes an illumination system 110, a light valve 140 and a lens device 150. In the embodiment, the illumination system 110 includes a red laser light source 112R (a first laser light source), a green laser light source 112G, a first blue laser light source 112B1 and a second blue laser light source 112B2, a first color wheel element 114 and a second color wheel element 116, a first light combiner D1, a second light combiner D2 and a third light combiner D3, a light uniforming element 121 and a light concentrator 123.

In the embodiment, the laser light sources of the illumination system 110 are used for providing laser lights of a plurality of different colors. For example, the red laser light source 112R, the blue laser light source 112G, the first blue laser light source 112B1 and the second blue laser light source 112B2 are respectively used for providing a red laser light LR, a green laser light LG, a first blue laser light LB1 and a second blue laser light LB2. The red laser light source 112R (the first laser light source) is disposed on an optical axis A, and the red laser light LR emitted from the red laser light source 112R is transmitted along the optical axis. In an embodiment, the green laser light source can be disposed on the optical axis A. In other words, the laser light source disposed on the optical axis A is one of the red laser light source and the green laser light source.

In the embodiment, the second color wheel element 116 is disposed on a transmission path of the second blue laser light LB2. The second blue laser light LB2 is converted into a yellow light LY by the second color wheel element 116. The second color wheel element 116 outputs the yellow light LY to the first light combiner D1. For example, the second color wheel element 116 is, for example, a phosphor wheel, which is capable of converting a wavelength of an excitation light into a color light with a wavelength different to that of the excitation light, and the second blue laser light LB2 incident to the phosphor wheel may excite phosphor powder thereon to generate the yellow light LY. Therefore, the phosphor wheel may convert the second blue laser light LB2 into the yellow light LY.

In the embodiment, the first light combiner D1, the second light combiner D2 and the third light combiner D3 are disposed on the optical axis A and located between the red laser light source 112R and the first color wheel element 114, and are pervious to the laser lights or reflect the laser lights, so as to combine the laser lights on the optical axis A. For example, the first light combiner D1 is located between the second blue laser light source 112B2 and the second color wheel element 116. The first light combiner D1 is pervious to the red laser light LR and the second blue laser light LB2, and reflects the yellow light LY. The second light combiner D2 is located between the first light combiner D1 and the third light combiner D3, and is on a transmission path of the green laser light LG. The second light combiner D2 is pervious to the red laser light LR and the yellow light LY, and reflects the green laser light LG. The third light combiner D3 is on a transmission path of the first blue laser light LB1 and is pervious to the red laser light LR, the green laser light LG and the yellow light LY, and reflects the first blue laser light LB1. In the embodiment, the first light combiner D1, the second light combiner D2 and the third light combiner D3 are, for example, dichroic mirrors, though the invention is not limited thereto. In an embodiment, the light combiners can also be hollow reflection mirrors. In other words, the light combiner of the embodiment of the invention can be any suitable optical element having the function of being pervious to the laser light or reflecting the laser light, and the type of the light combiner is not limited by the invention.

In the embodiment, the first color wheel element 114 is disposed on the optical axis A and on transmission paths of the laser lights LR, LG, LB1 and LY, so as to adjust wavelengths of the laser lights combined by the light combiners. For example, the first color wheel element 114 is, for example, a filter wheel, and has a plurality of coating sections corresponding to the wavelengths of the laser lights LR, LG, LB1 and LY for filtering lights of unnecessary wavelengths in each of the sections, so as to purify the color of each of the laser lights. For example, a red filtering section of the first color wheel element 114 is only pervious to the red laser light LR. In the embodiment, according to an actual design requirement, at least one side of the first color wheel element 114 on the optical axis A can be configured with a light diffuser to prevent generation of laser speckle.

In the embodiment, the light uniforming element 121 and the light concentrator 123 are disposed on the optical axis A, where the light concentrator 123 is, for example, a focusing lens, or composed of a plurality of lenses. The laser lights passing through the first color wheel element 114 are incident to the light uniforming element 121, and the light uniforming element 121 is, for example, an integration rod. The light uniforming element 121 uniforms the combined laser lights LR, LG, LB1 and LY and outputs a uniformed laser light LW to the light concentrator 123. Then, the light concentrator 123 focuses the uniformed laser light LW to the light valve 140, where the combined laser lights LR, LG, LB1 and LY are defined as lights generated in a timing sequence though rotation of the first color wheel element 114. Therefore, in the embodiment, the red laser light LR passes through the first light combiner D1, the second light combiner D2 and the third light combiner D3 sequentially to enter the light uniforming element 121; the green laser light LG is reflected by the second light combiner D2 and passes through the third light combiner D3 to enter the light uniforming element 121; the first blue laser light LB1 is reflected by the third light combiner D3 to directly enter the light uniforming element 121; and the second blue laser light LB2 passes through the first light combiner D1 to enter the reflective second color wheel element 116, and is converted into the yellow light LY, and the yellow light LY is reflected by the first light combiner D1 to pass through the second light combiner D2 and the third light combiner D3 sequentially to enter the light uniforming element 121.

In the embodiment, the light valve 140 is disposed on a transmission path of the uniformed laser light LW to modulate the uniformed laser light LW into an image light LM. The lens device 150 is disposed on a transmission path of the image light LM to project the image light LM to a screen 300. In the embodiment, the light valve 140 is, for example, a reflective light value such as a liquid crystal on silicon panel (LCoS panel), a digital micro-mirror device (DMD), etc., or a transmissive light valve such as a transparent liquid crystal panel, an electro-optical modulator, a magneto-optic modulator, an acousto-optic modulator (AOM), etc., though the type of the light valve 140 is not limited by the invention.

In the embodiment, the laser light sources, the color wheel elements, the light combiners, the light uniforming element, the light concentrator and the lens device can be implemented by any laser light source, color wheel element, light combiner, light uniforming element, light concentrator and lens device of the technical field, which is not limited by the invention. Since enough instructions and recommendations for detailed element structures, operations and implementations thereof can be learned from general acknowledge of the related technical field, detailed description thereof is not repeated. The types of the laser light sources, the color wheel elements, the light combiners, the light uniforming element, the light concentrator and the lens device are not limited by the invention.

In an exemplary embodiment of the invention, the optical axis A is, for example, a referential basis of the transmission path of the red laser light LR and the uniformed laser light LW between the red laser light source 112R (the first laser light source) and the light valve 140. In an exemplary embodiment of the invention, after the yellow light LR, the green laser light LG and the first blue laser light LB1 are combined by the corresponding light combiners, these lights are also propagated along the optical axis A.

Figure 2:
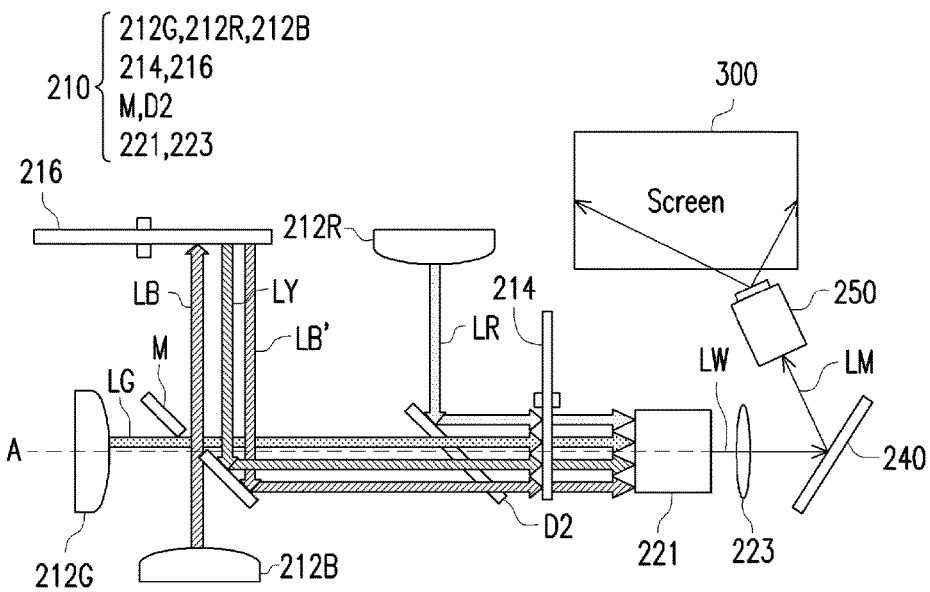
FIG. 2 is a schematic diagram of a projection device according to another embodiment of the invention.

FIG. 2 is a schematic diagram of a projection device according to another embodiment of the invention. Referring to FIG. 1 and FIG. 2, the projection device 200 of the embodiment is similar to the projection device 100 of FIG. 1, and a main difference therebetween lies in a configuration structure of the light source elements of the illumination system 210. In the embodiment, the illumination system 210 includes a red laser light source 212R, a green laser light source 212G (the first laser light source) and a blue laser light source 212B, a first color wheel element 214, a second color wheel element 216, a first light combiner M and a second light combiner D2, a light uniforming element 221 and a light concentrator 223.

In the embodiment, the laser light sources of the illumination system 210 provide laser lights of a plurality of different colors. For example, the red laser light source 212R, the green laser light source 212G and the blue laser light source 212B respectively provide a red laser light LR, a green laser light LG and a blue laser light LB. The green laser light source 212G is disposed on the optical axis A.

In the embodiment, the second color wheel element 216 is disposed on a transmission path of the blue laser light LB. The second color wheel element 216 converts a part of the blue laser light LB into a yellow light LY, and outputs the yellow light LY to the first light combiner M. For example, the second color wheel element 216 is, for example, a phosphor wheel, and the blue laser light LB incident to the phosphor wheel may excite phosphor powder thereon to generate the yellow light LY. Therefore, the phosphor wheel may convert a part of the blue laser light LB into the yellow light LY. In the embodiment, the second color wheel element 216 further h as a reflection section, which is adapted to reflect the other part of the blue laser light LB' to the first light combiner M.

In the embodiment, the first light combiner M and the second light combiner D2 are disposed on the optical axis A and between the green laser light source 212R and the first color wheel element 214, and are pervious to the laser lights or reflect the laser lights to combine the laser lights on the optical axis A. For example, the first light combiner M is located between the blue laser light source 212B and the second color wheel element 116, and is pervious to the green laser light LG and the blue laser light LB, and reflects the yellow light LY and the part of the blue laser light LB'. The second light combiner D2 is located between the first light combiner M and the first color wheel element 214, and is on a transmission path of the red laser light LR. The second light combiner D2 is pervious to the green laser light LG, the part of the blue laser light LB' and the yellow light LY, and reflects the red laser light LR. In the embodiment, the first light combiner M is, for example, a reflection mirror and the second light combiner D2 is, for example, a dichroic mirror, though the invention is not limited thereto. In an embodiment, the light combiners can all be dichroic mirrors. In other words, the light combiners of the invention can be any suitable optical element having the function of being pervious to the laser light or reflecting the laser light, and the type of the light combiners is not limited by the invention.

Therefore, in the embodiment, a hollow reflection mirror serves as the first light combiner M, and the hollow reflection mirror has a hole in the middle, such that the laser light may directly pass there through the hole of the first light combiner M. The second color wheel element 216 is separated into a yellow portion and a blue portion. The red laser light LR is reflected by the second light combiner D2 to enter the light uniforming element 221; the green laser light LG penetrates through the hole in the middle of the first light combiner M, and passes through the second light combiner D2 to enter the light uniforming element 221; the blue laser light LB penetrates through the hole in the middle of the first light combiner M to enter the second color wheel element 216, a part of the blue laser light LB is converted into the yellow light LY by the yellow portion and the other part of the blue laser light LB' is directly scattered by the blue portion, and then the yellow light LY and the part of the blue laser light LB' are transmitted to the first light combiner M through a light concentration cup or a light concentrator, and the first light combiner M reflects the yellow light LY and the part of the blue laser light LB' to the second light combiner D2 for entering the light uniforming element 221.

Since enough instructions and recommendations for detailed element structures, operations and implementations of other optical elements of the present embodiment can be learned from the description of the embodiment of FIG. 1, detailed description thereof is not repeated.

In summary, the embodiments of the invention have at least one of the following advantages or effects. In the embodiments of the invention, the illumination system uses the laser light sources to provide lights of different colors, and in collaboration with a configuration structure of the optical elements thereof, the laser lights with a wider color gamut are provided.

The foregoing description of the preferred embodiments of the invention as been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising:
a plurality of laser light sources, providing laser lights of a plurality of different colors, wherein the laser light sources comprise a first laser light source, and the first laser light source is disposed on an optical axis;
a first color wheel element, disposed on the optical axis and on a transmission path of the laser lights;
a plurality of light combiners, disposed on the optical axis and between the first laser light source and the first color wheel element, and pervious to the laser lights or reflecting the laser lights, wherein the light combiners combine the laser lights on the optical axis; and
a second color wheel element, disposed on a transmission path of one of laser lights, adapted to convert the one of the laser lights into a color light, and outputting the color light to a first light combiner of the light combiners, wherein a wavelength of the color light is different from a wavelength of the one of the laser lights.

2. The illumination system as claimed in claim 1, wherein the first laser light source is one of a red laser light source and a green laser light source.

3. The illumination system as claimed in claim 2, wherein the laser light sources comprise the red laser light source, the green laser light source, a first blue laser light source and a second blue laser light source respectively adapted to provide a red laser light, a green laser light, a first blue laser light and a second blue laser light, and the first laser light source is the red laser light source.

4. The illumination system as claimed in claim 3, wherein the second color wheel element is disposed on a transmission path of the second blue laser light, adapted to convert the second blue laser light into a yellow light, and outputting the yellow light to the first light combiner of the light combiners.

5. The illumination system as claimed in claim 4, wherein the light combiners comprise the first light combiner, a second light combiner and a third light combiner, the first light combiner is pervious to the red laser light and the second blue laser light, and reflects the yellow light; the second light combiner is pervious to the red laser light and the yellow light, and reflects the green laser light; and the third light combiner is pervious to the red laser light, the green laser light and the yellow light, and reflects the first blue laser light.

6. The illumination system as claimed in claim 5, wherein the first light combiner, the second light combiner and the third light combiner are dichroic mirrors.

7. The illumination system as claimed in claim 2, wherein the laser light sources comprise the red laser light source, the green laser light source and a blue laser light source respectively adapted to provide a red laser light, a green laser light and a blue laser light, and the first laser light source is the green laser light source.

8. The illumination system as claimed in claim 7, further comprising:
a second color wheel element, disposed on a transmission path of the blue laser light, adapted to convert a part of the blue laser light into a yellow light, outputting the yellow light to a first light combiner of the light combiners, and reflecting another part of the blue laser light to the first light combiner.

9. The illumination system as claimed in claim 8, wherein the light combiners comprise the first light combiner and a second light combiner, the first light combiner is pervious to the green laser light and the blue laser light, and reflects the yellow light and the another part of the blue laser light; and the second light combiner is pervious to the green laser light, the another part of the blue laser light and the yellow light, and reflects the red laser light.

10. The illumination system as claimed in claim 9, wherein the first light combiner is a reflection mirror with a hole and the second light combiner is a dichroic mirror.

11. The illumination system as claimed in claim 1, further comprising:
a light uniforming element and a light concentrator, disposed on the optical axis, wherein the light uniforming element uniforms the combined laser beams and outputs the uniformed laser beams to the light concentrator, and the light concentrator focuses the uniformed laser beams to a light valve.

12. A projection device, comprising:
an illumination system, comprising:

a plurality of laser light sources, providing laser lights of a plurality of different colors, wherein the laser light sources comprise a first laser light source disposed on an optical axis;

a first color wheel element, disposed on the optical axis and on a transmission path of the laser lights;

a plurality of light combiners, disposed on the optical axis and between the first laser light source and the first color wheel element, and pervious to the laser lights or reflecting the laser lights, so as to combine the laser lights on the optical axis; and a second color wheel element, disposed on a transmission path of one of laser lights, adapted to convert the one of the laser lights into a color light, and outputting the color light to a first light combiner of the light combiners, wherein a wavelength of the color light is different from a wavelength of the one of the laser lights;

a light valve, disposed on a transmission path of the combined laser lights, and modulating the combined laser lights into an image light; and a lens device, disposed on a transmission path of the image light.

13. The projection device as claimed in claim 12, wherein the first laser light source is one of a red laser light source and a green laser light source.

14. The projection device as claimed in claim 13, wherein the laser light sources comprise the red laser light source, the green laser light source, a first blue laser light source and a second blue laser light source respectively adapted to provide a red laser light, a green laser light, a first blue laser light and a second blue laser light, and the first laser light source is the red laser light source.

15. The projection device as claimed in claim 14, wherein the second color wheel element is disposed on a transmission path of the second blue laser light, and adapted to convert the second blue laser light into a yellow light, and outputs the yellow light to the first light combiner of the light combiners.

16. The projection device as claimed in claim 15, wherein the light combiners comprise the first light combiner, a second light combiner and a third light combiner, the first light combiner is pervious to the red laser light and the second blue laser light, and reflects the yellow light; the second light combiner is pervious to the red laser light and the yellow light, and reflects the green laser light; and the third light combiner is pervious to the red laser light, the green laser light and the yellow light, and reflects the first blue laser light.

17. The projection device as claimed in claim 16, wherein the first light combiner, the second light combiner and the third light combiner are dichroic mirrors.

18. The projection device as claimed in claim 13, wherein the laser light sources comprise the red laser light source, the green laser light source and a blue laser light source respectively adapted to provide a red laser light, a green laser light and a blue laser light, and the first laser light source is the green laser light source.

19. The projection device as claimed in claim 18, wherein the illumination system further comprises a second color wheel element, the second color wheel element is disposed on a transmission path of the blue laser light, and adapted to convert a part of the blue laser light into a yellow light, and outputs the yellow light to a first light combiner of the light combiners, and reflects another part of the blue laser light to the first light combiner.

20. The projection device as claimed in claim 19, wherein the light combiners comprise the first light combiner and a second light combiner, the first light combiner is pervious to the green laser light and the blue laser light, and reflects the yellow light and the another part of the blue laser light; and the second light combiner is pervious to the green laser light, the another part of the blue laser light and the yellow light, and reflects the red laser light.

21. The projection device as claimed in claim 20, wherein the first light combiner is a reflection mirror with a hole and the second light combiner is a dichroic mirror.

22. The projection device as claimed in claim 12, wherein the illumination system further comprises a light uniforming element and a light concentrator, the light uniforming element and the light concentrator are disposed on the optical axis, wherein the light uniforming element uniforms the combined laser beams and outputs the uniformed laser beams to the light concentrator, and the light concentrator focuses the uniformed laser beams to the light valve.

23. An illumination system, comprising:

a plurality of laser light sources, providing laser lights of a plurality of different colors, wherein the laser light sources comprise a first laser light source, a first blue laser light source and a second blue laser light source, and the first laser light source is disposed on an optical axis, wherein the first laser light source is one of a red laser light source and a green laser light source, wherein the first blue laser light source and the second blue laser light source are respectively adapted to provide a first blue laser light and a second blue laser light;

a first color wheel element, disposed on the optical axis and on a transmission path of the first blue light and a transmission path of a laser light provided by the first laser light source;

a plurality of light combiners, disposed on the optical axis and between the first laser light source and the first color wheel element, and pervious to or reflecting the laser light provided by the first laser light source, and combining the laser lights; and a second color wheel element, disposed on a transmission path of the second blue laser light, adapted to convert the second blue laser light into a color light, and outputting the color light to a first light combiner of the light combiners, wherein a wavelength of the color light is different from a wavelength of the second blue laser light.

24. An illumination system, comprising:

a plurality of laser light sources, providing laser lights of a plurality of different colors, wherein the laser light sources comprise a first laser light source and a blue laser light source, and the first laser light source is disposed on an optical axis, wherein the first laser light source is one of a red laser light source and a green laser light source, wherein the blue laser light source is adapted to provide the blue laser light;

a first color wheel element, disposed on the optical axis and on a transmission path of a laser light provided by the first laser light source;

a plurality of light combiners, disposed on the optical axis and between the first laser light source and the first color wheel element, and pervious to or reflecting the laser light provided by the first laser light source, and combining the laser lights; and a second color wheel element, disposed on a transmission path of the blue laser light, adapted to convert a part of the blue laser light into a color light, outputting the color light to a first light combiner of the light combiners, and reflecting another part of the blue laser light to the first light combiner, wherein a wavelength of the color light is different from a wavelength of the blue laser light, wherein the first color wheel element is disposed on a transmission path of the another part of the blue laser light from the first light combiner.

* * * * *